Feb. 28, 1961 R. T. McBRIDE 2,973,287
PROCESS OF COATING A POLYMERIC THERMOPLASTIC
DIELECTRIC FILM AND RESULTING ARTICLE
Filed Sept. 12, 1957

FIG. 1

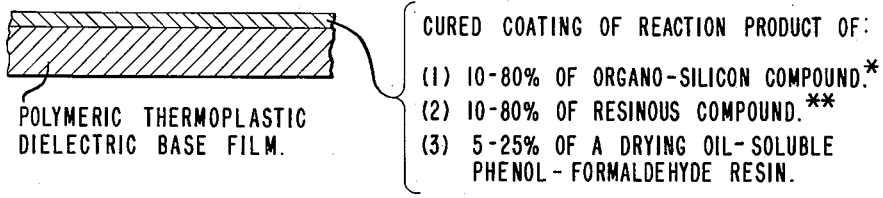

POLYMERIC THERMOPLASTIC DIELECTRIC BASE FILM.

CURED COATING OF REACTION PRODUCT OF:
(1) 10-80% OF ORGANO-SILICON COMPOUND.*
(2) 10-80% OF RESINOUS COMPOUND.**
(3) 5-25% OF A DRYING OIL-SOLUBLE PHENOL-FORMALDEHYDE RESIN.

FIG. 2

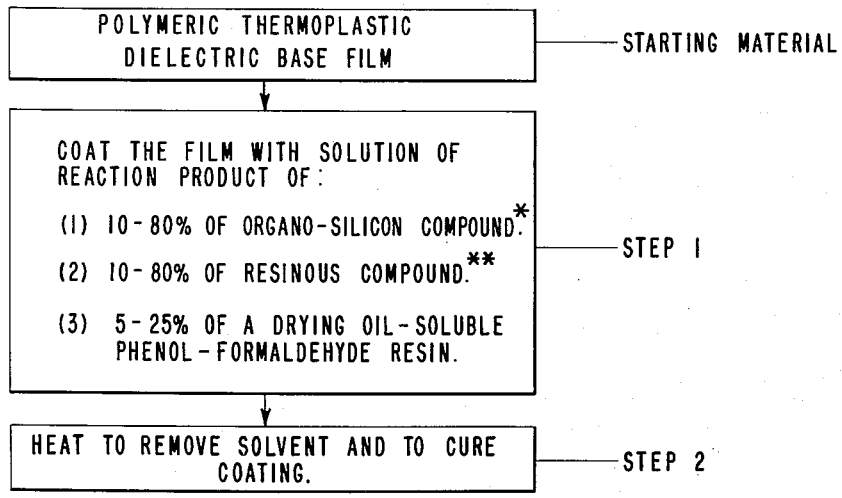

POLYMERIC THERMOPLASTIC DIELECTRIC BASE FILM — STARTING MATERIAL

COAT THE FILM WITH SOLUTION OF REACTION PRODUCT OF:
(1) 10-80% OF ORGANO-SILICON COMPOUND.*
(2) 10-80% OF RESINOUS COMPOUND.**
(3) 5-25% OF A DRYING OIL-SOLUBLE PHENOL-FORMALDEHYDE RESIN.
— STEP 1

HEAT TO REMOVE SOLVENT AND TO CURE COATING. — STEP 2

\* $\dfrac{R_n SiX_m O_{4-m-n}}{2}$ where R is a monovalent hydrocarbon radical; X is an alkoxy or hydroxyl radical; n has an average value of 1-2; m has an average value of .05-3; m+n is not greater than 4.

\*\* Alkyd resin from polycarboxylic acid or anhydride having 2-3 carboxyl radicals per molecule and polyhydric alcohol having 3-4 hydroxy radicals per molecule; or above alkyd resin modified with 10-70% of drying oil acid containing at least 8 carbon atoms; or a resin from a polyhydric alcohol having 3-4 hydroxy radicals per molecule and a drying oil acid containing at least 8 carbon atoms.

INVENTOR
RICHARD THOMAS McBRIDE

BY *Herbert M. Wolfson*
ATTORNEY

United States Patent Office 2,973,287
Patented Feb. 28, 1961

2,973,287

PROCESS OF COATING A POLYMERIC THERMOPLASTIC DIELECTRIC FILM AND RESULTING ARTICLE

Richard Thomas McBride, Buffalo, N.Y., assignor to E. I. du Pont de Nemours and Company, Wilmington, Del., a corporation of Delaware Filed Sept. 12, 1957, Ser. No. 683,474

8 Claims. (Cl. 117—138.8)

This invention relates to a process of improving the dielectric life of polymeric thermoplastic materials useful as electrical insulation and to the product of such process and, more particularly, to a coated polyethylene terephthalate film having an improved dielectric life. This application is a continuation-in-part of my copending application, Serial No. 581,376, filed April 30, 1956, now abandoned.

Polyethylene terephthalate film, particularly oriented film (film which has been stretched and/or rolled in two directions and heat-set at elevated temperatures within the range from 150°–250° C.) has been found to possess a unique combination of electrical, physical and chemical properties which make it outstanding for use as a dielectric. This is particularly true of polytheylene terephthalate film which has been stretched and/or rolled to substantially the same degree in both directions, e.g., 3X, where X equals the original dimension of the film, to obtain a substantially "balanced" film, which means that the physical properties of the film as measured in both directions are substantially the same. The oriented, heat-set, polyethylene terephthalate film is outstanding as a dielectric because it retains a considerable percentage of its electrical properties, strength, and durability at elevated operating temperatures. Consequently, the film is particularly useful as a dielectric in capacitors, motors, generators, transformers, etc., at not only moderate operating temperatures, but also at ambient temperatures approaching 150°–175° C.

In extending the usefulness of polyethylene terephthalate and like thermoplastic polymeric film dielectric to a wider variety of electrical end uses, it became apparent that the dielectric life of the film required improvement, particularly for use in equipment subjected to high voltage stresses. As employed herein, the term "dielectric life" of the polymeric thermoplastic film applies to the actual time that a particular film may be subjected to a particular voltage stress under conditions of corona discharge before actual physical breakdown, i.e., rupture, of the film dielectric.

It is the action upon the polymeric film dielectric of corona discharge (in air or other gaseous medium) which causes actual physical breakdown of the film under conditions of a particular voltage stress (a potential difference large enough to produce a visible discharge but not large enough to produce instantaneous breakdown). Obviously the lower the voltage stress, the longer the dielectric life of the film. "Corona discharge" is defined as the discharge of electricity which appears upon the surface of a conductor when the potential gradient exceeds a certain value. For example, when a continuous potential applied to a pair of narrow wires is slowly increased, the voltage will be reached at which a hissing noise is heard, and a pale violet light is visible (in the dark) around the wires. This voltage is defined as the "critical visual corona point." Corona is due to ionization of the air or surrounding gases (it does not occur in a vacuum). That is, the air in the ionized region is conducting, and this results in increasing the effective diameter of the conductor. For example, even though a film dielectric is wound tightly around a wire, air is not entirely excluded from the space between the conductor and the film dielectric; and it is the air or other gaseous medium which is ionized. The corona envelops a conductor as a concentric cylinder and the outside diameter becomes such that the gradient at that point decreases to the rupturing point of the air. Beyond this point, the corona cannot increase for the constant applied voltage because the gradient decreases with increasing radial distance from the wire. The glow or breakdown of the surrounding air starts first at the point of maximum gradient or at the conductor surface. It is the bombardment of the dielectric film with ions or electrons that actually results initially in roughening or pitting the surface of the film. As the bombardment continues, the film eventually ruptures; hence, this causes short circuits owing to the physical failure.

An object of the present invention is to provide a polymeric thermoplastic dielectric film having increased dielectric life. A further object is to provide a polyethylene terephthalate film dielectric having increased dielectric life. A further object is to provide a process of improving the dielectric life of polymeric thermoplastic dielectric compositions, particularly polyethylene terephthalate film. Other objects will be apparent from the following description of the invention.

These objects are realized in accordance with the present invention which, briefly stated, comprises providing a dielectric base film of thermoplastic polymeric material, e.g., polyethylene terephthalate, with a relatively thin, cured, adherent, continuous coating consisting essentially of the reaction product of (A) 10–80% by weight, based on the total weight of the coating, of an organo-silicon compound of the formula $$R_nSiX_mO_{\frac{4-m-n}{2}}$$

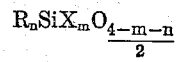

where R is selected frm the group consisting of monovalent hydrocarbon radicals; X is selected from the group consisting of alkoxy radicals and hydroxyl radicals, and $n$ has an average value of from 1–2, inclusive; $m$ has an average value of from .05–3, inclusive; $m+n$ being not greater than 4; (B) 10–80% of at least one resinous compound selected from the group consisting of (1) alkyd resins prepared from inter-reaction of an acidic compound selected from the group consisting of polycarboxylic acids and anhydrides having from 2–3 carboxyl radicals per molecule, and polyhydric alcohols having 3–4 hydroxy radicals per molecule, (2) alkyd resins of the type described in (1) modified with 10–70% of a drying oil acid containing at least 8 carbon atoms, and (3) resins prepared from the inter-reaction of polyhydric alcohols having 3–4 hydroxy radicals per molecule and drying oil acids containing at least 8 carbon atoms and (C) 0–25% by weight of a drying oil-soluble phenol-formaldehyde resin.

In the drawing, Figure 1 is a diagrammatic cross-sectional view of the coated film of the present invention and Figure 2 is a flow diagram illustrating the process of coating film in accordance with the present invention.

The present invention will be described specifically with respect to improving the dielectric life of polyethylene terephthalate film, but it should be understood that the invention is applicable as well to enhancing the dielectric life of other types of unplasticized thermoplastic films used as dielectrics, such as films of polyethylene, polytetrafluoroethylene, polystyrene, polyamides, etc.

The organo-silicon compounds which are operative in this invention may be found fully described in U.S.P. 2,718,507 to L. A. Rauner. These include monomeric silanes, polymeric partial hydrolyzates of silanes, and monomeric and polymeric completely hydrolyzed silanes. The preferred organo-silicones are the low molecular weight polysiloxanes having 2-50 siloxane [Si—O] units in the polymer chain. These polysiloxanes (described in U.S.P. 2,548,342—Goodwin and Hunter) are prepared by the partial hydrolysis of the type silane $R_nSiX_{4-n}$ where R is a saturated aliphatic radical of less than 7 carbon atoms or a monocyclic aryl radical and X is alkoxy or chlorine and $n$ has a value of 0.9-2.1. These partially-hydrolyzed polysiloxanes are usually mobile liquids in which the functional groups are alkoxy. These polysiloxanes contain from 0.9-2.1 silicon-bonded monovalent hydrocarbon radicals per silicon atom and from 0.5-2 silicon-bonded alkoxy radicals per silicon atom, the remaining valances of the silicon being satisfied by oxygen atoms of an Si—O—Si linkage. A preferred polysiloxane employed in the coating composition of the present invention is dimethyltriphenyl trimethoxy trisiloxane ("Sylkyd" 50)—manufactured by Dow Corning Corporation. The silicone content of the coating compositions may range from 10-80% with a content of 25-50% being preferred.

The alkyd resins used in the invention may be prepared by the inter-reaction of an acidic compound selected from the group consisting of polycarboxylic acid and anhydrides having from 2-3 carboxyl radicals per molecule and polyhydric alcohols having 3-4 hydroxyl radicals per molecule. The preferred composition is the alkyd resin obtained from inter-reaction of phthalic anhydride and glycerine and/or pentaerythritol. These alkyds are preferably further modified by the presence of a drying oil acid such as linseed oil acid, sardine oil acid, soya bean oil acid, dehydrated castor oil acid, tung oil acid, oiticica oil acid, perilla oil acid, chia oil acid, hemp seed oil acid, poppy seed oil acid, safflower oil acid, sunflower seed oil acid, and walnut oil acid. Any of the drying oils whose acid derivatives are listed above can be employed in this invention. The percent drying oil acid content of the above-mentioned resins may vary from 10-80% with 25-75% being preferred. Resins prepared by the inter-reaction of polyhydric alcohols having 3-4 hydroxyl radicals per molecule and any of the abovementioned drying oil acids may also be utilized.

Minor amounts, preferably from 5-25%, of phenol-formaldehyde resins may also be incorporated into the resin mixture. Any phenol-formaldehyde resin which is soluble in organic solvents and drying oils such as those normally employed in the paint and varnish industry, may be utilized in the process of the present invention. The term "phenol," as employed herein, includes both phenol and substituted phenols. Other aliphatic or aryl substituents may be present on the phenol, provided the resulting resin is oil-soluble. Both heat-reactive and non-heat-reactive phenol-formaldehyde resins are operative in this invention. Examples of resins which are operative herein are phenol-formaldehyde resins, p-tertiary butyl phenol-formaldehyde resins, p-tertiary amyl phenol-formaldehyde resins, and p-phenyl phenol-formaldehyde resins. The phenol-formaldehyde resins may be further modified with from 10-40% of a drying oil acid.

Although the method of preparation of the coating compositions is not critical, the preferred methods are as follows:

The organo-silicon compound, particularly when it is a low molecular weight polysiloxane having functional alkoxy groups, may be (1) reacted first with the polyhydric alcohol and small amounts of the polycarboxylic acid or anhydride at temperatures of 120-210° C. with elimination of alcohol. The remainder of the acid or anhydride may then be added and heated to 150-210° C. with the elimination of water. The mixture may then be chilled with an organic solvent to 125-140° C. and the heating continued at 150° C. until the desired viscosity is reached. (2) The organo-silicon compound may be added to the reaction mixture of a polyhydric alcohol (or mixtures of polyhydric alcohols) and drying oil or drying oil acids (small amounts of polycarboxylic acids or anhydrides may be present) which has been heated to 225-240° C. for 30 minutes to 1 hour with the elimination of water. The organo-silicon-drying oil ester of the polyhydric alcohol is then reacted at 200-210° C. with the elimination of volatiles. More drying oil or drying oil acids may then be added and the mixture heated to 200-210° C. for 1 hour. Minor portions of an oil-soluble phenol-formaldehyde resin may be introduced at this point. In this case, the mixture is then heated at 125-300° C. until the desired viscosity is obtained.

Other methods, obvious to those skilled in the art, for combining the components of the coating composition may also be employed.

The resins, prepared as described above, are applied to the film in the form of an organic solvent solution. The resinous mixture is dissolved in a solvent such as cyclohexanone, naphthol, mineral spirits, methyl ethyl ketone, or a blend of these with toluene or xylene. The percent solids contained in the coating composition solutions characteristic of this invention may range from 5-60% with a solids content of 20-40% being preferred.

The coating compositions in solution form, may be applied to one or both surfaces of the base film by any desired expedient, e.g., dipping, spraying, or brushing. The coated film is thereafter treated at room temperature or moderately elevated temperature to remove solvent and then at a more elevated temperature, e.g., about 150° C. for about 15-30 minutes, to cure the resinous mixture. Curing is important to give hardness and complete the polymerization. The process is illustrated in Figure 2.

The coating compositions of this invention may be enhanced by the addition of from 10-20% of a silica filler. Preferred fillers are the estersils, described in U.S.P. 2,657,149 to Ralph K. Iler. In brief, the estersils are esterified super-colloidal substrates, that is, a substrate in the form of particles coated with —OR groups, the substrate having a surface of silica and having a specific surface area of at least 2 carbon atoms wherein the carbon atom attached to oxygen is also attached to hydrogen. In general, the estersils have a specific area of at least 1 m.$^2$/gm. and usually within the range of 1-900 m.$^2$/gm.

The following examples will further illustrate the principles and practice of the present invention. Parts are by weight unless otherwise specified.

EXAMPLE 1

Two hundred thirty-five parts of dimethyl triphenyl trimethoxy trisiloxane ("Sylkyd" 50—Dow Corning), 69 parts glycerine and 7.5 parts phthalic anhydride was placed in a flask equipped with an agitator and a mercury seal. The mixture was heated at 120-210° C. and stirred for 4 hours. A slow stream of $CO_2$ was bubbled through the flask. Approximately 43.8 parts of methanol were distilled off. Forty-eight parts of phthalic anhydride were then added to the mixture and heated at 160-210° C. for 1¾ hours with the removal of water. Cyclohexanone (378.8 parts) was added at 180° C. which chilled the mixture to 133° C. Heating was continued at 150° C. until the viscous resinous mix was completely dissolved in the solvent. The resinous solution was diluted to 25% solids by the addition of 96 grams of methyl ethyl ketone. Polyethylene terephthalate film (0.5 mil thick) was then coated with the above resinous solution and air-dried at room temperature. The coated film was then cured in an oven at 150° C. for 30 minutes.

EXAMPLE 2

To 207.5 parts of a cyclohexanone solution of resin (48.7% solids) described in Example 1, was added 18 parts of estersil (described in U.S.P. 2,657,149 to Ralph K. Iler). The mixture was thinned with 100 parts of methyl ethyl ketone and the mixture was placed in a ball mill apparatus and agitated for 8 hours. The resulting fine dispersion of estersil in solvent solution of resin had a solids content of 38.8%. Polyethylene terephthalate film (0.5 mil thick) was coated with this mixture and air-dried at room temperature. The film was then cured in an oven at 150° C. for 30 minutes.

EXAMPLE 3

Polyethylene terephthalate film (0.5 mil thick) was coated with a coating material identical with that described in Example 2. The film was air-dried and cured in an oven in two stages. The first cure was carried out at 150° C. for 30 minutes and then the film was further cured at 200° C. for 20 minutes.

EXAMPLE 4

Polyethylene terephthalate film (0.5 mil thick) was coated with a solvent solution of ST-856 (25% phenyl silicone reacted with 75% alkyd resin—glyceryl phthalate modified with medium oil length type soya oil acid—Barrett Division of the Allied Chemical & Dye Corporation). The coated film was air-dried and then cured in an oven at 150° C. for 30 minutes.

EXAMPLE 5

Polyethylene terephthalate film (0.5 mil thick) was coated with a solvent solution of ST-873 (50% ethyl phenyl silicone resin reacted with 50% drying oil modified alkyd resin—glyceryl phthalate modified with short oil length type coconut oil acid)—Barrett Division of Allied Chemical & Dye Corporation. The coated film was air-dried and then cured in an oven at 150° C. for 30 minutes.

EXAMPLE 6

A 50-50% phenolic-silicone resin was prepared as follows: Dimethyl triphenyl trimethoxy trisiloxane ("Sylkyd" 50—Dow Corning Corporation) containing 20% methoxy groups was reduced to 12% methoxy groups by refluxing the resin with water, methanol, and hydrochloric acid for ½ hour and then distilling off the added and formed methanol.

Seventy-two parts of glycerine, 72 parts pentaerythritol and 218 parts of linseed fatty acid were placed in a glass flask and then heated at 230° C. for 30 minutes. Nitrogen was bubbled through the system. The mixture was then distilled with 11.5 parts distillate being collected. The content of the flask was cooled to 170° C. and 800 parts dimethyl triphenyl trimethoxy trisiloxane containing 12% methoxy groups, prepared as described above, were added. The temperature fell to 70° C. The mixture was heated and stirred with the passage of nitrogen through the system to 200° C. for 1 hour. The temperature was held at 200°–210° C. for another 90 minutes. The mixture was then distilled and 89.7 grams of distillate collected. Two hundred eighteen parts of linseed fatty acid ("Wecoline" L— E. F. Drew & Co.) were added and the contents heated to 200° C. and held at 200° C.–210° C. for 1 hour while the system was purged with nitrogen. The mix was then cooled to room temperature.

To 400 parts of the above reaction ingredients was added 38.25 parts "Bakelite" BR-9432 resin (phenolic varnish resin—Bakelite Corporation), and 12.75 parts "Arofene" 700 (heat-reactive phenolic resin—U.S. Industrial Chemicals, Inc.). The ingredients were heated with stirring and a nitrogen purge at 150°–280° C. for 3¼ hours. During this period, 26.5 parts of distillate were collected. Thirty-five parts of "bodied" linseed oil were added to chill the reactio mixture and then 360 parts of xylene were slowly added. The reaction contents were refluxed until the resin was dissolved in the solvent. The solvent-resin mixture contained 54% solids. Polyethylene terephthalate film (0.5 mil thick) was coated with the resin as described above in a xylene solution containing 40% solids. The film was air-dried and heat-set at 150° C. for 10 minutes.

EXAMPLE 7

To 120 parts of the resin prepared as described in Example 6, containing 54% solids was added 7.2 parts of estersil and 52.8 parts of xylene. This mixture was then milled in a ball mill apparatus for 140 hours. Polyethylene terephthalate film (0.5 mil thick) was then coated with the mixture and air-dried at room temperature. The coated film was then cured at 150° C. for 25 minutes.

EXAMPLE 8

Polyethylene terephthalate film (0.5 mil thick) was coated with a solvent solution (40% solids) of XR-875 (a phenolic-silicone varnish containing 25% silicone—Dow Corning Corporation). The film was then air-dried and cured in an oven for one hour at 180° C. The film had been first coated with a thin sub-coating (less than 1 gm./m.²) of a 60/40 copolyester of ethylene terephthalate ethylene isophthalate (reaction products of glycol and 60 parts dimethyl terephthalate and 40 parts dimethyl isophthalate).

EXAMPLE 9

The following formulation:

| | Parts |
|---|---|
| XR-875 (phenolic-silicone varnish—25% silicone content—Dow Corning) | 80 |
| Estersil (as described in U.S.P. 2,657,149) | 10 |
| Hexane | 135 | was placed in a ball mill for 72 hours.

Polyethylene terephthalate film (0.5 mil thick) was coated with the above-identified formulation and air-dried at room temperature. The coated film was then cured in an oven for 30 minutes at 180° C.

EXAMPLE 10

A 0.5 mil thick polyethylene terephthalate film was coated with a thin sub-coating (less than 1 gm./m.²) of a copolyester of ethylene terephthalate-ethylene isophthalate (60/40). The film was then coated with the coating composition identical with that described in Example 9 and air-dried. The coated film was then cured in an oven for 30 minutes at 180° C.

EXAMPLE 11

The following formulation:

| | Parts |
|---|---|
| XR-859 (phenolic-silicone varnish—50% silicone content—Dow Corning) | 90 |
| Estersil (as described in U.S.P. 2,657,149) | 10 |
| Hexane | 105 | was placed in a ball mill and milled for 72 hours.

Polyethylene terephthalate film (0.5 mil thick) was coated with the above-described formulation and air-dried at room temperature. The coated film was then cured in an oven for 30 minutes at 180° C.

EXAMPLE 12

Polyethylene terephthalate film (0.5 mil thick) was coated with a thin sub-coating (less than 1 gm./m.²) of a copolyester of ethylene terephthalate-ethylene isophthalate (60/40). The film was then coated with the coating composition identical with that described in Example 11, and air-dried. The coated film was then cured in an oven for 30 minutes at 180° C.

Table I, below, records the corona life of the coatings described in Examples 1–12, inclusive. The fifth failure in ten samples was taken as representative of possible corona life. Also listed are the overall thickness (gauge) of the coated film, and the temperature at which the corona life of the film was tested. All of the films under Examples 1–12 were coated on both sides.

Dielectric life test

The film sample to be tested was placed on a brass plate to which the high voltage was to be applied. A brass rod (6" long and ¼" in diameter) was placed on top of the film sample and normal to the brass plate (the film sample was sandwiched between the brass plate and an end of the brass rod). The rod served as the ground electrode. The end of the rod touching the film sample was rounded off at a radius of curvature of ⅟₁₆". The pressure exerted on the film was due only to gravitational forces on the rod. The entire test apparatus was set up in air. Sufficient voltage was applied to the plate to give a voltage stress of 1,000 volts per mil across the sample. Failure of the sample was indicated by a rapid increase in the flow of current between the brass plate and brass rod. The moment current flowed, an arc was struck between the electrodes, the arc passing through the hole in the film caused by the failure. The abrupt increase in the flow of current was used to trip a relay giving a record of the failure. Ten samples were treated simultaneously. The time of the failure of the fifth sample was used as a measure of the dielectric life (under corona discharge conditions) of the material tested.

TABLE I

*Dielectric life (corona resistance) of polyethylene terephthalate film (0.5 mil thick) coated with an alkyd and/or phenolic resins/finely divided particles composition*

| Example | Coating (Parts by Weight) | Overall Gauge Thickness in mils | Dielectric Life at 1,000 Volts/Mil—Time to 5th Failure of 10 Samples | |
|---|---|---|---|---|
| | | | Hours | Temp., °C. |
| Control | None | 0.05 | 10 | 23 |
| 1 | 50/50 alkyd resin/silicone resin | 0.84 | 30 | 23 |
| 2 | 50/50/15 alkyd/silicone/estersil.[1] | 1.36 | 16 | 23 |
| 3 | ___do___ | 0.93 | 40 | 23 |
| 4 | 50/50 alkyd/silicone | 1.26 | 27 | 23 |
| 5 | 75/25 alkyd/silicone | 0.95 | 19 | 23 |
| 6 | 50/50 alkyd-silicone/phenolic resin | 1.22 | 38 | 23 |
| 7 | 50/50/10 alkyd/silicone/phenolic estersil. | 1.22 | 38 | 23 |
| 8 | 25/75 silicone/phenolic | 1.20 | 56 | 23 |
| 9 | 25/75/10 silicone/phenolic/estersil. | 1.09 | 59 | 23 |
| 10 | ___do___ | 1.70 | 148 | 23 |
| 11 | 50/50/10 silicone/phenolic/estersil. | 1.11 | >197 | 23 |
| 12 | ___do___ | 1.28 | >148 | 23 |

[1] Described in U.S.P. 2,657,149.

As can be seen from the foregoing examples, the use of coatings composed of the herein-specified silicon compounds reacted with alkyd resins, modified alkyd resins, and phenolic resins as defined hereinbefore have substantially increased the corona life at 1,000 volts/mil at 23° C. and 120° C. These coatings extend the usefulness of polyethylene terephthalate, and like thermoplastic film dielectrics to a variety of end uses, particularly for use in equipment subjected to high voltage stresses. As employed herein, "dielectric life" of the polymeric thermoplastic film applies to the actual time that a particular film may be subjected to a particular voltage stress under conditions of corona discharge before actual physical breakdown, i.e., rupture, of the film dielectric.

I claim:

1. A polymeric thermoplastic dielectric base film having an adherent, continuous, cured coating consisting essentially of the reaction product of (A) 10–80% by weight, based on the total weight of the coating, of an organo-silicon compound of the formula $$R_nSiX_mO_{\frac{4-m-n}{2}}$$

where R is selected from the group consisting of monovalent hydrocarbon radicals; X is selected from the group consisting of alkoxy radicals and hydroxyl radicals, and n has an average value of from 1–2, inclusive; m has an average value from .05–3, inclusive; m+n being not greater than 4, (B) 10–80% of at least one resinous compound selected from the group consisting of (1) alkyd resins prepared from inter-reaction of an acidic compound selected from the group consisting of polycarboxylic acids and anhydrides having from 2–3 carboxyl radicals per molecule, and polyhydric alcohols having 3–4 hydroxy radicals per molecule, (2) alkyd resins of the type described in (1) modified with 10–70% of a drying oil acid containing at least 8 carbon atoms, and (3) resins prepared from the inter-reaction of polyhydric alcohols having 3–4 hydroxy radicals per molecule and drying oil acids containing at least 8 carbon atoms, and (C) 5–25% by weight of a drying oil-soluble phenol-formaldehyde resin.

2. Polyethylene terephthalate base film having an adherent, continuous, cured coating consisting essentially of the reaction product of (A) 10–80% by weight, based on the total weight of the coating, of an organo-silicon compound of the formula $$R_nSiX_mO_{\frac{4-m-n}{2}}$$

where R is selected from the group consisting of monovalent hydrocarbon radicals; X is selected from the group consisting of alkoxy radicals and hydroxyl radicals, and n has an average value of from 1–2, inclusive; m has an average value from .05–3, inclusive; m+n being not greater than 4, (B) 10–80% of at least one resinous compound selected from the group consisting of (1) alkyd resins prepared from inter-reaction of an acidic compound selected from the group consisting of polycarboxylic acids and anhydrides having from 2–3 carboxyl radicals per molecule, and polyhydric alcohols having 3–4 hydroxy radicals per molecule, (2) alkyd resins of the type described in (1) modified with 10–70% of a drying oil acid containing at least 8 carbon atoms, and (3) resins prepared from the inter-reaction of polyhydric alcohols having 3–4 hydroxy radicals per molecule and drying oil acids containing at least 8 carbon atoms, and (C) 5–25% by weight of a drying oil-soluble phenol-formaldehyde resin.

3. Balanced, heat-set, polyethylene terephthalate base film having an adherent, continuous, cured coating consisting essentially of the reaction product of (A) 10–80% by weight, based on the total weight of the coating, of an organo-silicon compound of the formula $$R_nSiX_mO_{\frac{4-m-n}{2}}$$

where R is selected from the group consisting of monovalent hydrocarbon radicals; X is selected from the group consisting of alkoxy radicals and hydroxyl radicals, and n has an average value of from 1–2, inclusive; m has an average value from .05–3, inclusive; m+n being not greater than 4, (B) 10–80% of at least one resinous compound selected from the group consisting of (1) alkyd resins prepared from inter-reaction of an acidic compound selected from the group consisting of polycarboxylic acids and anhydrides having from 2–3 carboxyl radicals per molecule, and polyhydric alcohols having 3–4 hydroxy radicals per molecule, (2) alkyd resins of the type described in (1) modified with 10–70% of a drying oil acid containing at least 8 carbon atoms, and (3) resins prepared from the inter-reaction of polyhydric alcohols having 3–4 hydroxy radicals per molecule and drying oil acids containing at least 8 carbon atoms, and (C) 5–25% by weight of a drying oil-soluble phenol-formaldehyde resin.

4. The product of claim 3 wherein (A) is dimethyl triphenyl trimethoxy trisiloxane.

5. The process which comprises coating a polymeric thermoplastic dielectric base film with a coating composition consisting essentially of the reaction product of (A) 10–80% by weight, based on the total weight of the coating, of an organo-silicon compound of the formula $$R_nSiX_mO_{\frac{4-m-n}{2}}$$

where R is selected from the group consisting of monovalent hydrocarbon radicals; X is selected from the group consisting of alkoxy radicals and hydroxyl radicals, and n has an average value of from 1–2, inclusive; m has an average value from .05–3, inclusive; $m+n$ being not greater than 4, (B) 10–80% of at least one resinous compound selected from the group consisting of (1) alkyd resins prepared from inter-reaction of an acidic compound selected from the group consisting of polycarboxylic acids and anhydrides having from 2–3 carboxyl radicals per molecule and polyhydric alcohols having 3–4 hydroxy radicals per molecule, (2) alkyd resins of the type described in (1) modified with 10–70% of a drying oil acid containing at least 8 carbon atoms, and (3) resins prepared from the inter-reaction of polyhydric alcohols having 3–4 hydroxy radicals per molecule and drying oil acids containing at least 8 carbon atoms, and (C) 5–25% by weight of a drying oil-soluble phenol-formaldehyde resin, dissolved in a volatile organic solvent for said reaction product, and thereafter heating the coated base film to remove the solvent and to cure the resulting coating.

6. The process of claim 5 wherein the base film is polyethylene terephthalate film.

7. The process of claim 5 wherein the base film is balanced, heat-set, polyethylene terephthalate film.

8. The process of claim 7 wherein (A) is dimethyl triphenyl trimethoxy trisiloxane.

References Cited in the file of this patent

UNITED STATES PATENTS

| | | | |
|---|---|---|---|
| 2,258,218 | Rochow | Oct. 7, | 1941 |
| 2,258,219 | Rochow | Oct. 7, | 1941 |
| 2,258,221 | Rochow | Oct. 7, | 1941 |
| 2,258,222 | Rochow | Oct. 7, | 1941 |
| 2,587,295 | Doyle | Feb. 26, | 1952 |
| 2,687,396 | McLean | Aug. 24, | 1954 |
| 2,717,900 | Plueddemann | Sept. 13, | 1955 |
| 2,724,704 | Millar | Nov. 22, | 1955 |
| 2,735,825 | Kress | Feb. 21, | 1956 |
| 2,751,316 | Philips | June 19, | 1956 |
| 2,768,149 | Millar | Oct. 23, | 1956 |
| 2,774,745 | Hedlund | Dec. 18, | 1956 |
| 2,786,778 | Palmquist | Mar. 26, | 1957 |
| 2,790,736 | McLaughlin et al. | Apr. 30, | 1957 |
| 2,821,518 | Edelman | Jan. 28, | 1958 |
| 2,875,098 | Blatz | Feb. 24, | 1959 |